(12) United States Patent
Hopp et al.

(10) Patent No.: US 9,676,435 B2
(45) Date of Patent: Jun. 13, 2017

(54) RELEASE VALVE FOR INFLATABLE SEAT CUSHION

(71) Applicant: Roho, Inc., Belleville, IL (US)

(72) Inventors: David Michael Hopp, Glen Carbon, IL (US); Anthony Eric Sprouse, II, O'Fallon, IL (US)

(73) Assignee: ROHO, Inc., Belleville, IL (US)

( * ) Notice: Subject to any disclaimer, the term of this patent is extended or adjusted under 35 U.S.C. 154(b) by 126 days.

(21) Appl. No.: 14/632,551

(22) Filed: Feb. 26, 2015

(65) Prior Publication Data

US 2015/0272340 A1     Oct. 1, 2015

Related U.S. Application Data

(60) Provisional application No. 61/969,993, filed on Mar. 25, 2014.

(51) Int. Cl.
*F16K 15/20* (2006.01)
*B62J 1/26* (2006.01)

(52) U.S. Cl.
CPC ........... *B62J 1/26* (2013.01); *Y10T 137/3584* (2015.04); *Y10T 137/87845* (2015.04)

(58) Field of Classification Search
CPC ...... F16K 11/10; F16K 11/105; F16K 15/207; F16K 17/048; F16K 17/168; Y10T 137/3584; Y10T 137/3646; Y10T 137/3677; Y10T 137/87861; Y10T 137/87877; Y10T 137/87845; Y10T 137/86879

USPC .................... 251/321, 77, 83; 441/41; 5/706
See application file for complete search history.

(56) References Cited

U.S. PATENT DOCUMENTS

| | | | | | |
|---|---|---|---|---|---|
| 1,209,213 | A | * | 12/1916 | Schneider | F16K 15/20 137/223 |
| 1,444,188 | A | * | 2/1923 | Key | B60C 23/0496 137/228 |
| 1,652,675 | A | * | 12/1927 | Key | B60S 5/043 137/227 |
| 2,344,492 | A | * | 3/1944 | Brubaker | B60C 29/064 137/223 |
| 3,479,868 | A | * | 11/1969 | Boyer | B60C 23/04 73/146.8 |
| 3,999,430 | A | * | 12/1976 | Parduhn | G01L 17/00 73/146.3 |
| 4,072,171 | A | * | 2/1978 | Nakazawa | A61B 5/0235 137/599.18 |
| 5,067,518 | A | * | 11/1991 | Kosmyna | B05B 7/12 137/522 |

(Continued)

*Primary Examiner* — R. K. Arundale
(74) *Attorney, Agent, or Firm* — Polsinelli PC

(57) ABSTRACT

A release valve for connection to an inflatable cushion comprising an air conduit, a fitting at a first end of the air conduit for insertion into an air tube in fluid communication with the interior of the cushion, and an air inlet port at the opposite end of the air conduit and a filter assembly at the air inlet port. There is first, vertically orientated, spring biased ball valve centrally positioned in the air conduit including at least one air egress vent and being operatively associated with a spring biased actuator in the ball valve housing for opening the first ball valve. The button and first ball valve define a gap to minimize accidental air release. A second longitudinally orientated, spring biased ball valve is positioned in the air conduit adjacent the air inlet port.

10 Claims, 4 Drawing Sheets

(56) References Cited

U.S. PATENT DOCUMENTS

| | | | | |
|---|---|---|---|---|
| 5,613,515 | A * | 3/1997 | Huang | B60S 5/04 137/224 |
| 5,819,781 | A * | 10/1998 | Wu | B60S 5/04 137/223 |
| 6,409,486 | B1 * | 6/2002 | Baek | A43B 5/0407 251/321 |
| 6,550,086 | B2 | 4/2003 | Boyd | |
| 8,893,741 | B2 * | 11/2014 | Weng | F04B 53/10 137/224 |
| 2005/0129544 | A1 * | 6/2005 | Wu | F04B 33/005 417/440 |
| 2005/0263185 | A1 * | 12/2005 | Chen | F04B 33/005 137/231 |
| 2005/0274831 | A1 * | 12/2005 | Burdick | F16K 1/38 239/569 |
| 2006/0162796 | A1 * | 7/2006 | Lee-Liao | F16K 11/22 137/881 |
| 2011/0162734 | A1 * | 7/2011 | Colussi | F16K 11/105 137/544 |
| 2012/0227831 | A1 * | 9/2012 | Kozuschek | F16K 15/20 137/231 |
| 2015/0101678 | A1 * | 4/2015 | Chu | B60C 29/068 137/228 |

* cited by examiner

RELEASE VALVE FOR INFLATABLE SEAT CUSHION

CROSS REFERENCE TO RELATED APPLICATIONS

This application claims the benefit of U.S. Provisional Application Ser. No. 61/969,993 filed Mar. 25, 2014 which is incorporated herein by reference.

STATEMENT REGARDING FEDERALLY SPONSORED RESEARCH OR DEVELOPMENT

Not Applicable.

BACKGROUND OF THE INVENTION

The application relates generally to valves for inflatable apparatus, more specifically, to a release valve for an inflatable seat cushion to bleed air from an inflated cushion to equalize pressure on various points of a seated user's anatomy.

Inflatable seat cushions are well known. They are employed in all types of seating applications including vehicle seating. One particularly useful application of inflatable cushions, such as inflatable air cell cushions, is in motorcycle seating. In general, a motorcycle seat is constructed to support the seated rider's buttocks and, depending upon the size and style, a portion of the upper thigh. Most motorcycle seats or saddles are constructed from firm support padding or foam with a leather or vinyl covering. In use, the rider straddles the seat, thereby exposing the inner thigh, buttocks and genital area to pressure and vibration. If the rider is seated for long periods of time he can develop discomfort, soreness and even numbness in these regions of the anatomy due to pressure and vibration on the nerves. Furthermore, riders of other vehicles, such as bicycles, motor scooters and the like can suffer from similar discomforts.

It is advantageous to have a seat cushion that provides support while relieving pressure on sensitive areas of the anatomy. This may be accomplished by incorporating an inflatable air cell cushion in or on the motorcycle seat. To function well for a wide variety of riders, the cushion needs to be adjustable. That is, the cushion should include a pump so that the rider can inflate the cushion. If the rider overinflates then he needs to bleed air out of the cushion until he reaches his comfort zone. Hence, it would be advantageous for the cushion to include a release valve.

A release valve should be easy to use by a seated rider and should be well sealed so that vibration, bouncing and other pressures on the seat cushion do not cause it to leak air through the release valve, resulting in a deflated cushion.

These advantages apply equally well to any vehicle seat or medical seating such as wheelchair cushions or inflatable mattresses.

SUMMARY OF THE INVENTION

In one aspect, a release valve for connection to an inflatable cushion comprising an air conduit, a fitting at a first end of the air conduit for insertion into an air tube, the air tube being in fluid communication with the interior of the cushion, and an air inlet port at the opposite end of the air conduit. There may be a filter assembly at the air inlet port. There is first, vertically orientated, spring biased ball valve in a housing centrally positioned in the air conduit. The housing includes at least one air egress vent. The first ball valve is operatively associated with a spring biased actuator in the ball valve housing for opening the first ball valve. In one aspect, the actuator is a spring biased button. There is a gap or disconnect between the button and the ball valve to minimize the risk of accidental air release. There is a second longitudinally orientated, spring biased ball valve in the air conduit adjacent the air inlet port.

In use, the cushion is inflated by pumping air through the filtered air inlet port. The pump creates sufficient pressure to overcome the bias strength of the spring to open the second ball valve and allow ingress of air through the air conduit and into the cushion. If the cushion is overinflated, the user depresses the button to overcome the biasing force of the spring, as well as to overcome the biasing force against the first ball valve to allow airflow from the cushion back through the first ball valve and out through vents in the first ball valve housing.

DETAILED DESCRIPTION

Figure 1:
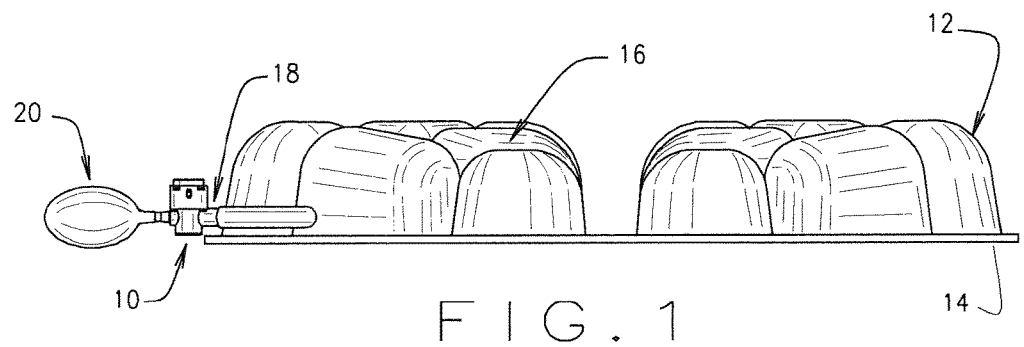
FIG. 1 is one aspect of a cushion incorporating a release valve.
Figure 2:
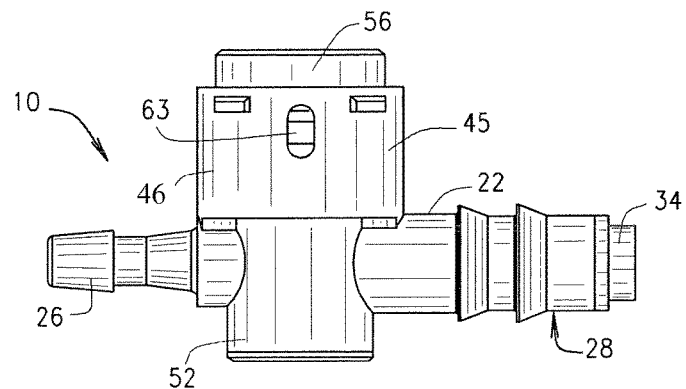
FIG. 2 is a bottom side elevational view of a release valve.
Figure 3:
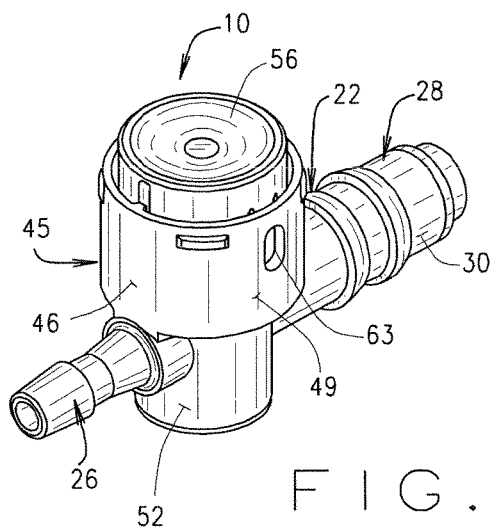
FIG. 3 is a perspective view thereof.
Figure 4:
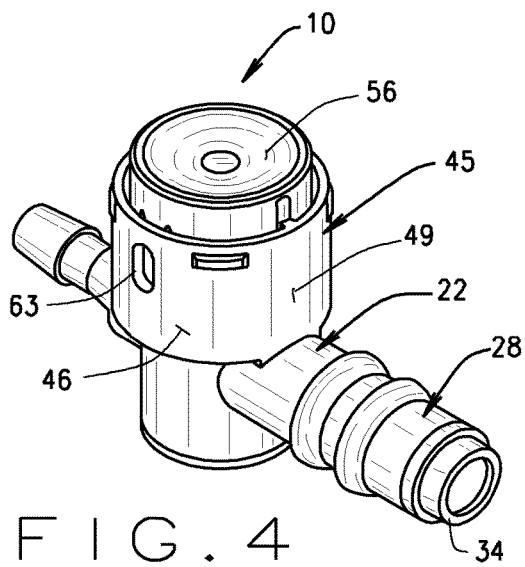
FIG. 4 is another perspective view thereof.
Figure 5:
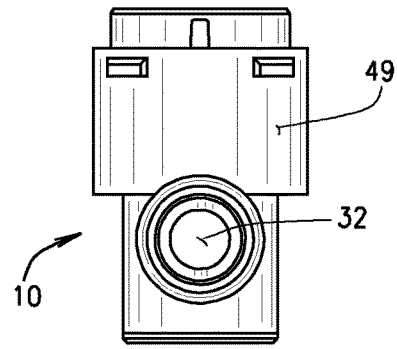
FIG. 5 is and end plan view thereof.
Figure 6:
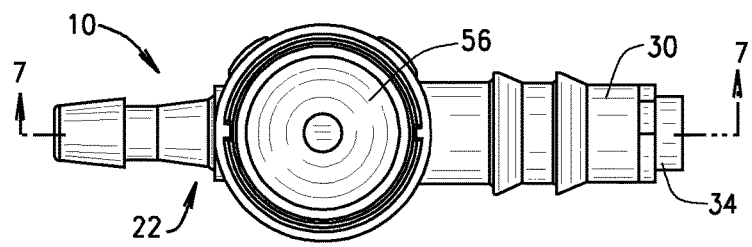
FIG. 6 is a top plan view thereof.

One aspect of a release valve for an inflatable cushion is indicated generally be reference number 10 in the drawings. FIG. 1 shows release valve 10 functionally attached to an inflatable motorcycle seat cushion, indicated generally by reference number 12 in the drawings. Although referred to as a motorcycle cushion for brevity and clarity, it will be appreciated the cushion can be employed with any seat, particularly, but not limited to, seats on vehicles, either self-propelled or motorized. The cushion can be an inflatable air cell cushion for medical or therapeutic use as well.

Cushion 12 includes a base 14 with a plurality of upstanding air inflation cells 16 arranged in an array on the base. In one aspect, cells 16 are inflatable air cells and are generally hollow open-bottomed cells connected by a web which comprises the top layer of base 14. In one aspect, the web and cell arrangement are dip molded from neoprene, as disclosed in U.S. Pat. No. 4,541,136, which is incorporated herein by reference. However, the web and cell arrangement may be formed in any acceptable manner from any acceptable material, such as cavity molded or dip molded plastic material or thermoformed plastic molding or any appropriate molding process. Moreover, the cells can be combinations of different cells, such as combinations of inflatable air cells with foam cells or gel filled cells as desired for modification of the support characteristics of the cushion. Cushion 12 could be one inflatable cell or bladder and not divided into separate inflatable cells. The salient point is that the cushion, or part of the cushion, is inflatable.

As shown, release valve 10 is operatively associated with a hollow air tube 18. Air tube 18 can be any length and is in fluid communication with air cells such that air can be introduced into the cushion for inflation through tube 18. In the arrangement show, release valve 10 is positioned between the cushion and a pump 20. Pump 20 is operatively associated with the release valve to pump air through the release valve and inflate the cushion. The illustrated pump 20 is a hand-operated bulb pump. However, any pump that functions appropriately to inflate the cushion will suffice.

The elements of one aspect of release valve 10 are illustrated in FIGS. 2 through 8. Valve 10 comprises an elongated tubular air conduit 22 defining an inner bore 24. A first end of air conduit 22 comprises a fitting 26 configured to fit snugly in an air tight arrangement with air tube 18 leading into the cushion. Fitting 26 can be affixed inside the air tube in any appropriate manner such as with a tight friction fit or glue or a tight retainer ring around the tubing.

The second or opposite end of air conduit 22 comprises a fitting 28 configured and sized to fit securely with bulb pump 20. It can be configured and sized to fit securely inside a tube 18 which in turn would be in fluid communication with a pump. Any arrangement will suffice as long as fitting 28 is associated with the pump 20.

Figure 7:
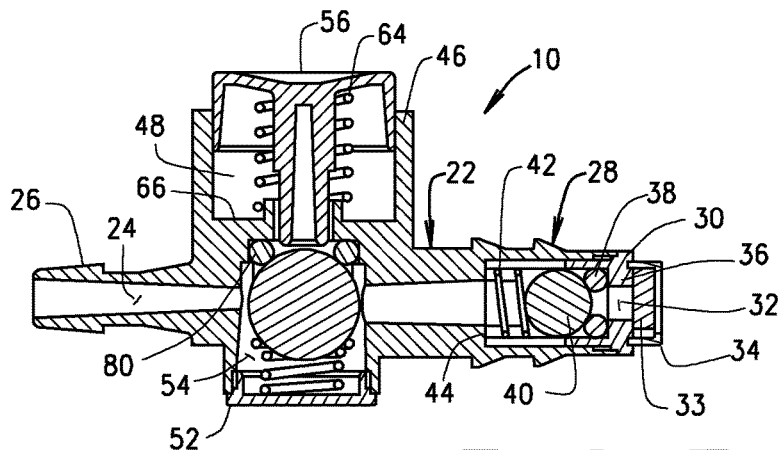
FIG. 7 a cross-sectional view taken along line 7-7 of FIG. 6.
Figure 8:
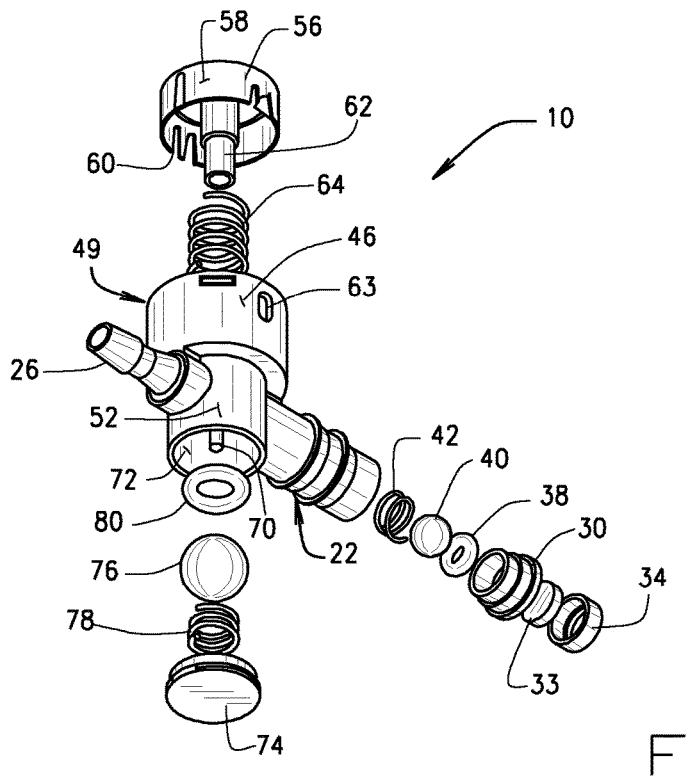
FIG. 8 is an exploded view thereof.

As best seen in FIGS. 7 and 8, fitting 28 may include an associated filter 30 assembly. Filter assembly 30 is designed to capture grit or dirt or other materials that could enter valve 10 from the pump 20 or ambient air during inflation of the cushion and foul the working elements inside the valve. Filter assembly 30 has a tubular configuration defining an inner bore 32 with an internal filter element 33 end cap 34 to close it off. Bore 32 is in fluid communication with bore 24 of air conduit 22. There is a circumferential O-ring seat 36 inside bore 32 adjacent the end. An O-ring 38 is positioned against seat 36. A ball 40 is positioned within bore 32 against O-ring 38. There is a bias spring 42 positioned between ball 40 and an internal circumferential shoulder 44 inside bore 24. Spring 42 exerts a biasing force against ball 40 to force it against O-ring 38 to form an airtight seal within filter assembly 30. It will be appreciated that the combination of O-ring 38, ball 40 and spring 42 form a longitudinally disposed one-way ball valve. Also, the configuration of the O-ring, seat and end cap may be any useful configuration. For example, the O-ring may have a conventional circular cross-section or the O-ring may be flat, like a washer and of an appropriate thickness. Moreover, the hardness of the O-ring may be of any useful Durometer such that it functions well as intended to form a seal.

There is a vertically disposed valve housing 45 at the approximate midpoint of air conduit 22. As shown in the drawings, valve housing 45 comprises an open top cylindrical body 46 defining an internal chamber 48 on a first side of the air conduit. Cylindrical body 46 comprises a circumferential wall 49 that includes one or more vents 50 in fluid communication with chamber 48. There is a cylindrical ball housing 52 on the opposite side of the air conduit defining an internal chamber 54. It will be noted that chamber 48, bore 24 and chamber 54 are in fluid communication with each other in use, as will be explained.

There is a release button 56 positioned in the open top of cylindrical body 46 and extending into chamber 48. Button 56 is slidingly engaged in chamber 48. Button 56 includes a circumferential depending wall 58 with at least one groove 60 or other opening form in the wall. Button 56 also includes a concentric, vertical stem 62. There is a snap-fit catch 63 in cylindrical body 46 to hold the button in place. This allows the button and stem to be one piece. A bias spring 64 is positioned around stem 62 and abuts the top side of shoulder 66. Spring 64 normally urges button upwardly in chamber 48.

Cylindrical ball housing 52 comprises a circumferential wall 68 having ribs 70 for centering a ball and in a chamber 72. Housing 52 is open ended, but in use is closed by a cap 74. There is a ball 76 positioned in chamber 72 and centered by ribs 70, a bias spring 78 between cap 74 and ball 76, and an O-ring 80 seated against the bottom side of shoulder 66. Bias spring 78 normally urges ball 76 against O-ring 80 to block air flow through vents 50 and maintain a constant pressure within the cushion. The spring, ball and O-ring together form a vertically disposed ball valve. It will be appreciated from the drawings, that release button 56, and more particularly stem 62 is not physically connected to ball 72.

Figure 9:
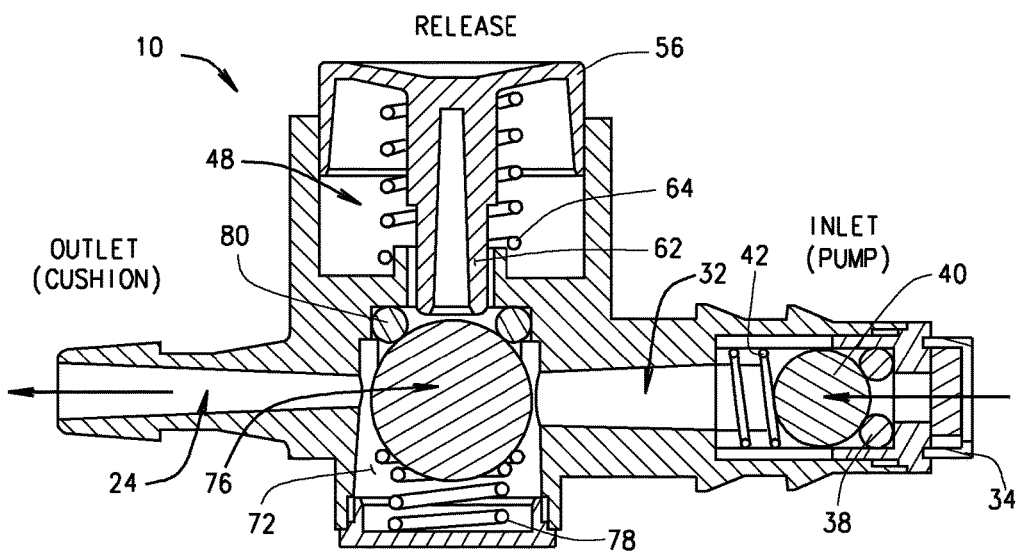
FIG. 9 is a cross-sectional view of a release valve showing inflation through the release valve.
Figure 10:
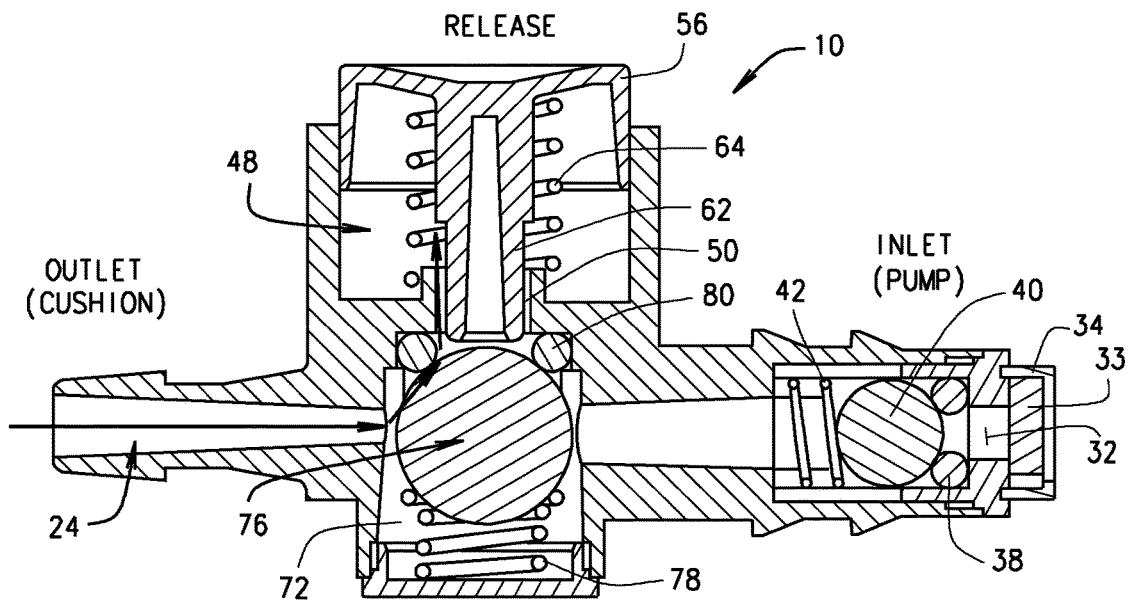
FIG. 10 is a cross-sectional view thereof showing bleeding air from a cushion.
Figure 11:
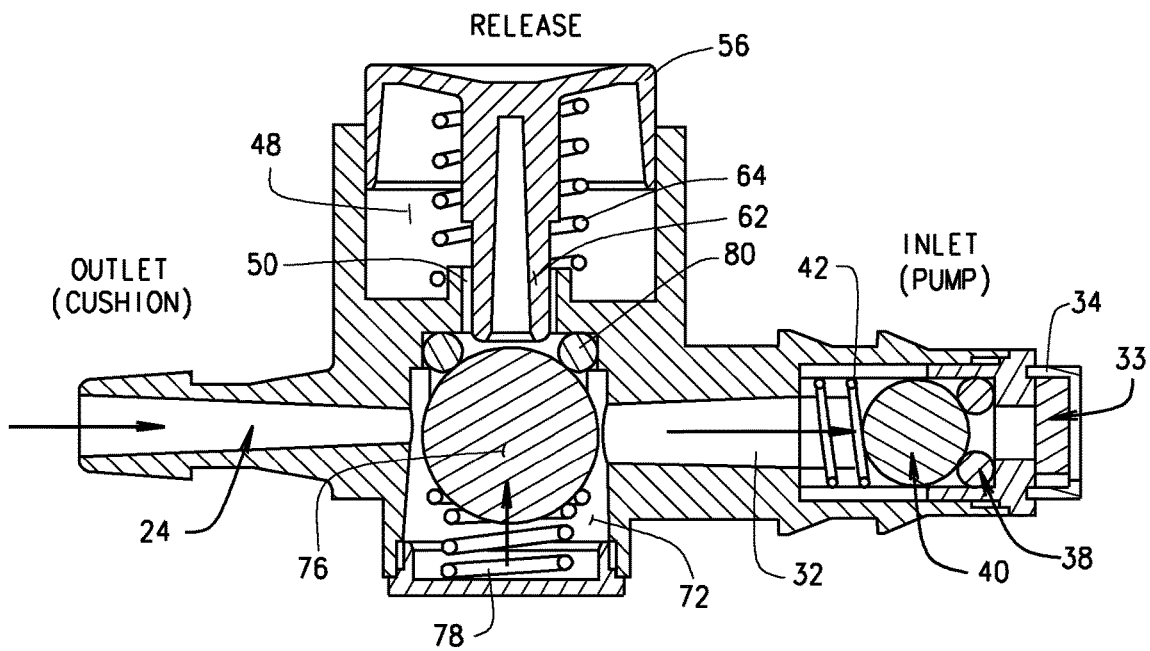
FIG. 11 is a cross-sectional view thereof showing the release valve in a static state.

FIGS. 9 through 11 illustrate release valve 10 in various stages of use. Referring to FIG. 9, to inflate the cushion the pump is actuated and the force or air pressure generated by the pump over comes the biasing force of spring 42, moving ball 40 away from O-ring 38 such that air can flow through bore 32, air chamber 72, bore 24 and into the cushion.

If the cushion is over inflated, the user can bleed air through valve 10 as illustrated in FIG. 10. The user depresses release button 56 sufficiently to overcome the biasing force of spring 64. Stem 62 engages ball 76 to urge it away from O-ring 80. Air from the cushion flows through bore 24, through chamber 72 and out through vents 50. When proper or comfortable inflation is reached, the user releases button 56. At stasis, that is, when the user releases button 56, as shown in FIG. 11, ball 76 is biased against O-ring 80 to form a seal. Moreover, spring 42 biases ball 40 against O-ring 38 to form another airtight seal.

The foregoing arrangement of elements exhibit several important features, among many. By way of example, the entire valve 10 can be constructed and hermetically sealed. Also, because release button 56 is not connected to ball 76, inadvertent opening of the ball valve is avoided by bumping or touching the release button. The release valve can be conveniently manipulated by a seated user. The combination of two ball valves prevents air leakage from vibration of bouncing on the seat cushion. Many other advantages of the release valve will be recognized by those skilled in the relevant art.

It will be appreciated that various changes and modification may be made in the motorcycle seat cushion of the present invention without departing from the scope of the invention. By way of example only, the cushion can have different configurations and be constructed in varying sizes so as to fit on different types of motorcycle saddles. The cushion and the cover can be constructed of different materials as well. The embodiment shown and described is intended to be illustrative of the broader aspects of the invention and should not be construed in a limiting sense.

The invention claimed is:

1. A release valve for use with an inflatable cushion comprising:
   a longitudinal air conduit having a fitting at a first end for insertion into an air tube being in fluid communication with the interior of the cushion and an air inlet port at a second end;
   a spring biased button biased by a first spring;
   a second spring biasing a vertically oriented, spring biased ball valve in a housing positioned in the longitudinal air conduit, wherein the vertically oriented, spring biased ball valve is actuated by the spring biased button; and a longitudinally oriented, spring biased, one-way valve in the air conduit adjacent the air inlet port.

2. The release valve of claim 1 wherein the longitudinally oriented, spring biased, one-way valve is a ball valve.

3. The release valve of claim 1 wherein the spring biased button and a ball in the vertically oriented, spring biased ball valve define a gap there between to prevent accidental release of air.

4. The release valve of claim 1 wherein the second end further comprises a filter assembly.

5. The release valve of claim 1 wherein the housing is positioned at an approximate midpoint of the longitudinal air conduit.

6. A release valve for use with an inflatable cushion comprising:

a longitudinal air conduit having a fitting at a first end for insertion into an air tube being in fluid communication with the interior of the cushion and an air inlet port at a second end; and a spring biased button;

a vertically oriented, spring biased ball valve in a housing positioned in the longitudinal air conduit, wherein the vertically oriented, spring biased ball valve is actuated by the spring biased button;

wherein the spring biased button and a ball in the vertically oriented, spring biased ball valve define a gap there between to prevent accidental release of air.

7. The release valve of claim 6 wherein the housing for the spring biased button and the ball in the vertically oriented, spring biased ball valve is positioned at the approximate midpoint of the longitudinal air conduit.

8. The release valve of claim 6 further comprising a second longitudinally oriented, spring biased, one-way ball valve in the air conduit adjacent the air inlet port.

9. The release valve of claim 6 wherein the air inlet port further comprises a filter assembly.

10. A release valve for use with an inflatable cushion comprising:

a longitudinal air conduit having a fitting at a first end for insertion into an air tube being in fluid communication with the interior of the cushion and an air inlet port at a second end;

a spring biased button;

a vertically oriented, spring biased ball valve in a housing positioned in the longitudinal air conduit, wherein the vertically oriented, spring biased ball valve is actuated by the spring biased button;

a longitudinally oriented, spring biased, one-way ball valve in the air conduit adjacent the air inlet port; and a filter assembly in the air inlet port;

wherein the spring biased button and a ball in the vertically oriented, spring biased ball valve define a gap there between to prevent accidental release of air; and wherein the vertically oriented, spring biased ball valve and the longitudinally oriented, spring biased, one-way ball valve cooperate to prevent leakage of air from the cushion through the release valve.

* * * * *